United States Patent
Hsich et al.

(10) Patent No.: US 6,263,920 B1
(45) Date of Patent: Jul. 24, 2001

(54) MULTI-LAYER ASSEMBLY FOR FLUID AND VAPOR HANDLING AND CONTAINMENT SYSTEMS

(75) Inventors: Henry S. Hsich, Rochester Hills, MI (US); Dean T. Su, Princeton Junction, NJ (US)

(73) Assignee: Hybritech Polymers, Mercerville, NJ (US)

( * ) Notice: Subject to any disclaimer, the term of this patent is extended or adjusted under 35 U.S.C. 154(b) by 0 days.

(21) Appl. No.: 09/568,875

(22) Filed: May 9, 2000

Related U.S. Application Data

(63) Continuation-in-part of application No. 09/435,737, filed on Nov. 8, 1999, now Pat. No. 6,176,268, which is a continuation-in-part of application No. 09/376,511, filed on Aug. 18, 1999, now Pat. No. 6,192,942, which is a continuation-in-part of application No. 09/326,719, filed on Jun. 7, 1999, now Pat. No. 6,155,304, which is a continuation-in-part of application No. 08/676,728, filed on Jul. 8, 1996, now Pat. No. 5,931,201, which is a continuation-in-part of application No. 08/593,068, filed on Jan. 29, 1996, now Pat. No. 5,934,336.

(51) Int. Cl.$^7$ .................................................. F16L 11/04
(52) U.S. Cl. ......................... 138/137; 138/140; 138/141
(58) Field of Search .................. 138/137, 140, 138/141, DIG. 1, DIG. 3, DIG. 7; 128/412, 422

(56) References Cited

U.S. PATENT DOCUMENTS

| | | | | |
|---|---|---|---|---|
| 3,070,132 | * | 12/1962 | Sheridan ............................. | 138/103 |
| 3,166,688 | * | 1/1965 | Rowand et al. ................. | 138/103 X |
| 3,473,087 | * | 10/1969 | Slade .................................... | 138/103 |
| 3,561,493 | * | 2/1971 | Maillard ............................... | 138/141 |
| 3,907,955 | * | 9/1975 | Viennot ................................ | 264/105 |
| 3,913,625 | * | 10/1975 | Gazda et al. ......................... | 138/140 |
| 4,196,464 | * | 4/1980 | Russell ............................. | 138/140 X |
| 4,643,927 | * | 2/1987 | Leucke et al. ......................... | 428/36 |
| 4,706,713 | * | 11/1987 | Sadamitsu et al. ................... | 138/137 |
| 4,887,647 | * | 12/1989 | Igarashi et al. ...................... | 138/126 |
| 5,038,833 | * | 8/1991 | Brunnhofer .......................... | 138/137 |
| 5,076,329 | * | 12/1991 | Brunnhofer .......................... | 138/137 |
| 5,142,782 | * | 9/1992 | Martucci ......................... | 138/125 X |
| 5,170,011 | * | 12/1992 | Martucci .............................. | 138/184 |
| 5,284,184 | * | 2/1994 | Noone et al. ......................... | 138/121 |
| 5,383,087 | * | 1/1995 | Noone et al. ......................... | 138/137 |
| 5,419,374 | * | 5/1995 | Nawrot et al. ....................... | 138/137 |
| 5,460,771 | * | 10/1995 | Mitchell et al. ...................... | 264/508 |
| 5,469,892 | * | 11/1995 | Noone et al. ......................... | 138/121 |
| 5,474,822 | * | 12/1995 | Rober et al. ..................... | 138/140 X |
| 5,500,263 | * | 3/1996 | Rober et al. ..................... | 138/140 X |
| 5,520,223 | * | 5/1996 | Iorio et al. ....................... | 138/138 X |
| 5,524,673 | * | 6/1996 | Noone et al. ..................... | 138/137 X |
| 5,554,425 | * | 9/1996 | Krause et al. .................... | 138/137 X |
| 5,566,720 | * | 10/1996 | Cheney et al. ....................... | 138/137 |
| 5,653,266 | * | 8/1997 | Reynolds ............................. | 138/137 |

OTHER PUBLICATIONS

0551094 European Pat. Off.*
WO 9321466 WIPO.*
WO 9325835 WIPO.*
WO 9409303 WIPO.*
WO 9523036 WIPO.*
Henry S. Hsich, "Morphology and Property Control via Phase Separation or Phase Dissolution During Cure in Multiphase Systems", pp. 186–203, 1990. Advances in Polymer Technology, vol. 10, No. 3.*

* cited by examiner

Primary Examiner—Patrick Brinson
(74) Attorney, Agent, or Firm—Wood Phillips VanSanten Clark & Mortimer

(57) ABSTRACT

A multi-layer assembly for fluid and vapor handling and containment systems. The multi-layer tubing assembly comprises a permeation resistance layer of polymeric material and a layer of multiphase polymer surrounding the permeation resistance layer.

26 Claims, No Drawings

MULTI-LAYER ASSEMBLY FOR FLUID AND VAPOR HANDLING AND CONTAINMENT SYSTEMS

This application is a continuation-in-part of application Ser. No. 09/435,737 filed on Nov. 8, 1999 now U.S. Pat. No. 6,176,268, which is a continuation-in-part of application Ser. No. 09/376,511 filed on Aug. 18, 1999 now U.S. Pat. No. 6,192,942, which is a continuation-in-part of Ser. No. 09/326,719 filed on Jun. 7, 1999 now U.S. Pat. No. 6,155,304, which is a continuation-in-part of Ser. No. 08/676,728 filed on Jul. 8, 1996 now U.S. Pat. No. 5,931,201, which is a continuation-in-part of Ser. No. 08/593,068, filed on Jan. 29, 1996 now Pat. No. 5,934,336.

BACKGROUND OF THE INVENTION

The present invention relates to multi-layer tubing for fluid and vapor handling systems. More specifically, it relates to a low cost and high performance flexible multi-layer tubing for use in brake and fuel line systems which has high mechanical and burst strength and low permeation.

Tubing assemblies for the transport of liquids and vapors are well known in the art. In fuel-line applications, tubing assemblies are exposed to a variety of deleterious and harmful conditions. The tubing is in nearly constant contact with fuel and other automotive fluids and additives. Also, there are external environmental factors such as stone impact and corrosive media (such as salt) to consider. Furthermore, engine temperatures often rise to extremely high levels, and, in cold climates, there is exposure to extremely low temperatures as well.

This abundance of considerations has led to design of tubing assemblies having multiple layers. The materials of each layer have specific, and preferably complementary, properties. Inner tubing layers, for example, are typically designed to be resistant to permeation by liquids and gases, while outer layers possess mechanical strength and shock resistance.

The art contains numerous examples of multi-layer tubing assemblies. U.S. Pat. No. 3,561,493 to Maillard discloses a tubing assembly having two coextruded layers of different plastics, and a coextruded layer of adhesive therebetween. The layers are chosen from plastics having complementary properties. U.S. Pat. No. 4,643,927 to Luecke et al. discloses a tubing assembly having a central barrier layer of polyvinylidene chloride that is relatively gas impermeable. The barrier layer is surrounded by inner and outer adhesive layers which in turn are surrounded by inner and outer surface layers of polyethylene that protect the central barrier layer from degradation. U.S. Pat. No. 4,887,647 to Igarishi et al. shows a multi-layer tubing assembly having an inner fluororubber layer that prevents degradation due to amine-type additives and also exhibits improved adhesion to an outside rubber layer. U.S. Pat. No. 5,038,833 to Brunnhofer discloses a tubing assembly having a protective outer polyamide layer, a middle alcohol barrier layer of polyvinylalcohol, and an inner water barrier layer of polyamide. U.S. Pat. No. 5,076,329 to Brunnhofer shows a five-layer tubing assembly having outer, inner and middle layers of nylon, and intermediate bonding and solvent-blocking layers.

Another requirement for fuel lines is provision for discharge of internal static electricity. Accumulated, undissipated electric charge can eventually cause a breach in a fuel line. U.S. Pat. No. 3,166,688 to Rowand et al. and U.S. Pat. No. 3,473,087 to Slade disclose polytetrafluoroethylene (PTFE) tubing assemblies having electrically conductive inner layers to facilitate dissipation of static electrical energy.

More recent developments in multi-layer tubing design have been motivated by governmental regulations limiting permissible hydrocarbon emissions. It is known that fluoropolymers exhibit good permeation resistance to hydrocarbon fuels. Hence, recent multilayer tubing assemblies have usually included at least one permeation-resistant fluoropolymer layer. Difficulties have been encountered, however, in finding a commercially viable design. Multi-layer tubing assemblies utilizing fluoropolymers tend to be rigid and inflexible, particularly at low temperatures. Fluoropolymers having strong mechanical properties typically do not bond well with other non-fluoropolymers. Conversely, fluoropolymers exhibiting good bondability (polyvinylidene fluoride (PVDF), in particular) tend to be mechanically weak.

U.S. Pat. No. 5,383,087 to Noone et al. is a recent example. It includes an outer impact-resistant polyamide layer, an intermediate bonding layer, an inner permeation-resistant PVDF layer, and an innermost conductive PVDF layer for dissipation of electrostatic charge. All layers are coextruded. The innermost conductive layer exhibits an exceptional electrostatic dissipation capacity in the range of $10^{-4}$ to $10^{-9}$ ohm/cm$^2$. Materials possessing such extremely high conductivity, however, are typically metallic or brittle plastic. Consequently, they are difficult to extrude and also exhibit poor mechanical properties. Furthermore, most of the fluoropolymers disclosed in the '087 patent bond poorly with dissimilar polymers.

The fluoropolymer bonding problem is addressed in U.S. Pat. No. 5,419,374 to Nawrot et al. Nawrot et al. disclose a multi-layer coextruded tubing assembly having an outer layer of polyamide 12, an inner PVDF layer, and a middle adhesion binder layer (a mixture of polyurethane and ethylene/vinyl acetate copolymer). Though, as discussed above, PVDF demonstrates better adhesion to the polyamide layer, PVDF multi-layer tubing suffers from poor cold impact resistance. This is due to the fact that PVDF becomes brittle at low temperatures.

Other high performance fluoropolymers, such as ethylene tetrafluoroethylene (ETFE), exhibit better cold impact resistance but again, have experienced bonding problems. One approach in the art has been to pretreat the ETFE surface using methods such as chemical etching, plasma discharge or corona discharge. European Patent Application publication no. 0 551 094, for example, discloses a multi-layer tubing assembly in which an inner ETFE layer is treated by corona discharge to enhance bonding to an outer polyamide layer. Similarly, PCT international application WO 95/23036 treats an inner ETFE layer with plasma discharge to achieve better bonding with an outer thermosetting elastomer layer. In the same vein, U.S. Pat. No. 5,170,011 etches a fluorocarbon inner layer to promote better bonding with a polyamide outer layer. These approaches, too, have their problems. Pretreatment processes such as corona and plasma discharge are expensive and can be environmentally hazardous. Furthermore, in many cases (such as with corona treatment), only temporary bonding is achieved and delamination may occur with aging.

Another approach has been to utilize multi-layer tubing assemblies having fluoroelastomer permeation-resistant layers and non-fluoroelastomer cover layers. U.S. Pat. Nos. 4,842,024, 4,905,736, 5,093,166 and 5,346,681 are exemplary. More recently, fluoropolymers have been used as a permeation-resistant layer along with non-fluoroelastomers or polyolefin thermoplastic elastomers as a cover layer. These approaches, however, require a two-step cross-head extrusion process and may also require a vulcanization process. Such processes are expensive and slow, and the mechanical strength and cold impact resistance of the resulting tubing is poor.

Often, there is need for a reinforcement layer in the tubing as well. The art contains numerous examples of multi-layer tubings which include reinforcement layer(s). U.S. Pat. Nos. 4,196,464, 4,330,017 and 4,759,338 disclose reinforced flexible tubings which have a fiber braiding or filament winding between elastomer layers. The fiber braiding and/or filament winding processes used to make these tubings are slow and expensive. Also, use of elastomers entails a time consuming vulcanization process conducted at high temperatures which may be environmentally hazardous.

U.S. Pat. Nos. 5,142,782, 5,142,878 and 5,170,011 disclose reinforced tubings which include a fiber glass braiding layer over a layer of fluoropolymer such as PTFE (polytetrafluoroethylene). The processes involved in making these tubings are also expensive and time consuming, typically involving the multiple steps of: (1) sintering and extruding an inner PTFE tubing layer; (2) applying a braided reinforced glass fiber layer over the inner layer; (3) dispersing a PTFE resin and carrier fluid into the reinforcing layer; and (4) sintering the assembled tubing.

SUMMARY OF THE INVENTION

This invention relates to a multi-layer assembly for fluid and vapor handling and containment systems. The multi-layer tubing assembly comprises a permeation resistance layer of polymeric material and a layer of multiphase polymer surrounding the permeation resistance layer.

DETAILED DESCRIPTION OF THE PREFERRED EMBODIMENTS

A first embodiment of the present invention is a four-layer tubing assembly for use in liquid fuel-line applications. It includes an extruded innermost semi-conductive fluoropolymer layer. The fluoropolymer is made semi-conductive by mixing it with 1% to 10% by weight of conductive carbon black. Metallic conductive fillers such as silver, copper or steel may also be utilized. It has a surface resistivity in the range of about $10^3$ to $10^8$ ohm/sq. Suitable fluoropolymers for inner layer include but are not limited to ethylene tetrafluoroethylene, fluorinated ethylene propylene, hexafluoropropylene, perfluoromethyvinylether, chlorotrifluoroethylene, ethylene chlorotrifluoroethylene, tetrafluoroethylene hexafluoropropylene vinylidene, perfluoroalkoxy, polyvinylindene, polytetrafluoroethylene, and copolymers, blends and mixtures thereof.

An inner permeation-resistant fluoropolymer layer coextrudable at temperatures below 600 degrees Fahrenheit is coextruded with and surrounds the innermost semi-conductive layer. The importance of this layer being extrudable at temperatures below 600 degrees Fahrenheit resides in the fact that the materials contained in the cover and/or outer layers, such as polyamides, must be extruded at temperatures below 600 degrees Fahrenheit. Temperatures above 600 degrees Fahrenheit may liquefy materials such as polyamides and make them unsuitable for extrusion. Fluoropolymers suitable for the permeation-resistant layer are the same as those fluoropolymers identified as suitable for the semi-conductive layer.

An adhesive layer is coextruded around the inner permeation-resistant layer. The adhesive is a polymer blend or alloy that has a multiphase morphology wherein one phase is compatible or miscible with the fluoropolymer utilized in the inner tubing layers, and another phase is compatible or miscible with the multiphase polymer utilized in the cover layer. Morphology development and mechanisms of phase separation in polymer alloys and blends is known and is described in the inventor's prior art publication, "Morphology and Property Control via Phase Separation or Phase Dissolution during Cure in Multiphase Systems", Advances in Polymer Technology, Vol. 10, No. 3, pp. 185–203 (1990). Use of polymer blends and alloys having multiphase morphology is also described in the inventor's prior art publications, H. S. -Y. Hsich, Proc. 34$^{th}$ Int. SAMPE Symp., 884 (1989), H. S. -Y. Hsich, J Mater. Sci., 25, 1568 (1990), H. S. -Y. Hsich, Polym. Eng. Sci., 30, 493 (1990).

The material for forming the adhesive layer is a polymer blend or alloy that has a multi-phase morphology wherein one phase is compatible or miscible with fluoropolymer and another phase is compatible or miscible with polyamides. To obtain sufficient bonding between each phase of the adhesive layer with the adjoining layers, at least 25% volume fraction of one phase is miscible with the polymer for forming one of the adjoining layer and at least 25% volume fraction of a second phase is miscible with the polymer for forming the other adjoining layer.

A flexible multiphase polymer cover layer is coextruded around the adhesive layer. The multiphase polymer has at least two glass transition temperatures in which their morphology and property can be manipulated by a thermodynamic process to create the desired damping characteristic. This concept of morphology control through a thermodynamic process to create the desired damping characteristic is also described in the inventor's prior art publications cited above. Suitable multiphase polymers include but are not limited to homopolymers, copolymers, terpolymers, polymer blends and polymer alloys of polyamides, polyesters, polyurethanes, polyvinyl chlorides, polyalklene napthalate, polyutylene terephthalate, polyolefins, matallocene polyolefins, polyarylic, maleic anhyride modified polyolefins and ionomer resins. The polyamides include but are not limited to polyamide 12, polyamide 6, their copolymers and terpolymers. The flexible multiphase polymer can be formed to be rubber-like without the requirement of vulcanization. These rubber-like multiphase polymers have hardnesses in the range of Shore A 50–98 and tensile strengths in the range of 3000–6000 psi (20–40 MPa). Alternatively, the flexible multiphase polymers can be formed to be plastic-like having higher hardnesses and tensile strengths than the rubber-like multiphase polymers.

A desirable morphology and mechanical properties of the polymer blends or alloys for forming the adhesive layer and the cover layer of multiphase polymers can be further improved by blending two or more immiscible polymers with a compatibilizer which will consequently result in improved adhesive strength. Furthermore, during the coextrusion process of the multi-layer hose or tubing, the rheological properties of the polymer blends or alloys can be properly modified to allow the material for forming the adhesive layer or the cover layer of multiphase polymers to obtain proper viscosity and elasticity to achieve the optimal property for extrusion. Such materials for compatibilizers and rheology modifiers include but are not limited to organomers, organometallics, organophosphates, silanes, acrylate modified polyolefins, acrylate modified fluoropolymers, acrylate derivative modified polyolefins, acrylate derivative modified fluoropolymers, fluoroelastomers and mixtures thereof. To obtain optimal adhesive strength and proper viscosity and elasticity for extrusion, the polymer blends or alloys having a multi-phase morphology should comprise 0.5% to 20% of compatibilizers and rheology modifiers by weight.

The multiphase polymer for forming the outer layer may have a non-foamed structure or a foamed structure. A foamed multiphase polymer offers the tubing assembly the same degree of strengths as a non-foamed multiphase polymer, yet the usage of foamed multiphase polymer for forming the outer layer significantly reduces the weight of the tubing compared to the non-foamed multiphase polymer. This reduction in weight is due to the presence of void spaces in the multiphase polymer formed during the foaming process.

The foaming of the multiphase polymer is caused by the addition of a blowing agent into the multiphase polymer. Examples of such blowing agents include but are not limited to azodicarbonamides, hydrazine derivatives, semicarbazides, tetrazoles, benzoxazines and mixtures thereof. The blowing agent is mixed with the multiphase polymer just prior to the extrusion process. Following the extrusion of the outer-layer, the blowing agent will cause the multiphase polymer to expand or foam, thus creating void spaces within the outer layer.

A second embodiment of the present invention is a three-layer tubing assembly for use in liquid fuel-line applications. It includes an extruded inner semi-conductive and permeation-resistant fluoropolymer layer. The fluoropolymer is made semi-conductive by mixing it with 1% to 10% by weight of conductive carbon black. It has a surface resistivity in the range of about $10^3$ to $10^8$ ohm/sq. The fluoropolymer can undergo extrusion at temperatures below 600 degrees Fahrenheit. Suitable fluoropolymers are the same as those fluoropolymers identified as suitable in the first embodiment.

An adhesive layer is coextruded around the inner permeation-resistant layer. The adhesive, as in the first embodiment, is a polymer blend or alloy that has a multiphase morphology wherein one phase is compatible or miscible with the utilized fluoropolymer, and another phase is compatible or miscible with the utilized multiphase polymer. A multiphase polymer cover layer is coextruded around the adhesive layer. Suitable multiphase polymers are the same as those identified as suitable for the first embodiment.

A third embodiment of the present invention is a three-layer tubing assembly for use in vapor fuel-line applications. It includes an extruded inner permeation-resistant fluoropolymer layer. The fluoropolymer is extrudable at temperatures below 600 degrees Fahrenheit. Suitable fluoropolymers are the same as those identified above.

An adhesive layer is coextruded around the inner permeation-resistant layer. The adhesive, as in the first and second embodiments, is a polymer blend or alloy that has a multiphase morphology wherein one phase is compatible or miscible with fluoropolymer and another phase is compatible or miscible with a multiphase polymer.

A multiphase polymer cover layer is coextruded around the adhesive layer. Suitable multiphase polymers are the same as those identified above.

A fourth embodiment of the present invention is a four-layer tubing assembly for use in vapor fuel-line applications. The fourth embodiment is the same as the third embodiment but includes an additional, outermost plastic layer. Suitable plastics for this outermost layer include polyamides and polyesters.

The fifth embodiment of the present invention comprises a reinforced flexible tubing including an inner layer of fluoropolymer, a reinforcing fabric ribbon layer and a cover layer. Suitable fluoropolymers for the inner layer include but are not limited to ethylene tetrafluoroethylene, fluorinated ethylene propylene, hexafluoropropylene, perfluoromethyvinylether, chlorotrifluoroethylene, ethylene chlorotrifluoroethylene, tetrafluoroethylene hexafluoropropylene vinylidene, perfluoroalkoxy, polyvinylindene, polytetrafluoroethylene, and copolymers, blends and mixtures thereof.

The cover layer may be comprised of the same material as the inner layer or it may be comprised of multiphase polymers. The multiphase polymers for forming the cover layer are the same as those multiphase polymers identified as suitable for forming the cover layer in the first embodiment.

A reinforcing fabric ribbon layer is disposed between the inner layer and cover layer. The tubing is manufactured by simultaneously wrapping the reinforcing fabric ribbon and extruding the cover layer around the inner fluoropolymer tubing layer. Expensive and time consuming prior art process steps such as braiding, dispersing binders or adhesive, sintering or vulcanization are not needed.

A sixth embodiment of the present invention is a three-layer tubing assembly for use in liquid fuel-line applications. It includes an extruded inner conductive and permeation-resistant metallic layer. Suitable metals for forming the metallic layer include but are not limited to copper, aluminum or aluminum alloy. The molten metal, or the utilized metal in its liquid state, is extruded to form the metallic layer.

After the metallic layer has been sufficient cooled, a thermoplastic protective layer is extruded around the metallic layer. Suitable thermoplastics for the protective layer include but are not limited to polyamides and polyesters. A multiphase polymer cover layer is coextruded around the thermoplastic protective layer. Suitable multiphase polymers for forming the cover layer are the same as those identified as suitable for forming the cover layer in the first embodiment.

A seventh embodiment of the present invention is a two-layer tubing assembly for use in vapor fuel-line applications. It includes an extrudable inner permeation-resistant thermoplastic layer. Suitable thermoplastics for forming the inner layer include but are not limited to fluoropolymers, polyamides, polyester, polyurethanes, polyvinyl chloride, polyketones, polyolefins and mixtures thereof.

A multiphase polymer cover layer, capable of bonding to the thermoplastic inner layer, is coextruded around the thermoplastic layer. Suitable multiphase polymers for forming the cover layer are the same as those identified for forming the cover layer in the first embodiment.

An eighth embodiment of the present invention is a three-layer tube assembly for use in vapor fuel-line applications. It includes an innermost layer of nanocomposite, a middle layer of adhesive and a cover layer of multiphase polymer.

Polymer nanocomposites are the combination of a polymer matrix resin and inorganic particles. The resulting nanocomposite particle has at least one dimension (i.e., length, width or thickness) in the nanometer size range.

The benefits of using nanocomposites for forming the inner layer include efficient reinforcement with minimum loss of ductility and impact strength, heat stability, flame resistance, improved gas barrier properties, improved abrasion resistance, reduced shrinkage and residual stress, altered electronic and optical properties. The benefits of using nanocomposites for forming the inner layer result from the compactness of the nanocomposite particles. For instance, since the particles are very small, the voids between the particles are also very small, thus reducing gas leakage through the wall of the tubing formed of nanocomposite.

A number of inorganic particles can be used for forming the nanocomposite. Such inorganic particles include but are not limited to clay and montmorillonite. The use of clay for forming the nanocomposite is preferred since clay is the inorganic particle easiest to work with. To obtain the desirable properties of the nanocomposite, should clay be used as the inorganic particles, the nanocomposite should comprise 0.1% to 10% of clay by weight.

A wide variety of polymers can be used as the matrix resins for forming the nanocomposites. The polymer which can used as the matrix resins include but are not limited to polyamides, polystyrene, polyetherimide, acrylate and methacrylate oligomers, polymethyl methacrylate, polyproylene, polyethylene oxide, epoxy, polyimide, unsaturated polyester and mixtures thereof.

An adhesive layer is coextruded around the inner layer of nanocomposite. The adhesive, as in the first embodiment, is a polymer blend or alloy that has multiphase morphology wherein one phase is compatible or miscible with the nanocomposite forming the inner layer and another phase is compatible or miscible with the multiphase polymer forming the cover layer.

A multiphase polymer cover is coextruded around the adhesive layer. Suitable multiphase polymers are the same as those identified in the first embodiment.

A ninth embodiment of the present invention is a three-layer tube assembly for use in vapor fuel-line applications. It includes an inner layer of nanocomposite, a middle layer of adhesive and a cover layer of thermoplastic. Suitable nanocomposites for forming the inner layer are the same as those identified as suitable for the eighth embodiment.

An adhesive layer is coextruded around the inner layer of nanocomposite. The adhesive, as in the first embodiment, is a polymer blend or alloy that has multiphase morphology wherein one phase is compatible or miscible with the nanocomposite forming the inner layer and another phase is compatible or miscible with the thermoplastic forming the cover layer.

A cover layer of thermoplastic is coextruded around the adhesive layer. Suitable thermoplastics for forming the cover layer include but are not limited to fluoropolymers, polyamides, polyester, polyurethanes, polyvinyl chloride, polyketones, polyolefins and mixtures thereof. The thermoplastic can be formed having a non-foamed structure or a foamed structure. The process for foaming the thermoplastic is the same process for foaming the multiphase polymer as disclosed in the first embodiment.

A tenth embodiment of the present invention is a two-layer tubing assembly for use in vapor fuel-line applications. It includes an inner layer of nanocomposite. Suitable nanocomposites for forming the inner layer are the same as those identified for the eighth embodiment.

A multiphase polymer cover layer, capable of bonding to the nanocomposite for forming the inner layer, is coextruded around the inner layer. Suitable multiphase polymers for forming the cover layer are the same as those identified as suitable for forming the cover layer in the first embodiment.

An eleventh embodiment of the present invention is a two-layer tubing assembly for use in fuel-line applications or a two-layer container assembly for use in fuel containment applications. It includes an inner layer of a modified fluoropolymer containing a reactive group. Examples of such fluoropolymers to be modified include but are not limited to ethylene tetrafluoroethylene, fluorinate ethylene propylene, hexafluoropropylene, perfluoromethyvinylether, chlorotrifluoroethylene, ethylene chlorotrifluoroethylene, tetrafluoroethylene hexafluoropropylene vinylidene, perfluoromethyvinylether, chlorotrifluoroethylene, ethylene chlorothrifluoroethylene, tetrafluoroethylene hexafluoropropylene vinylidene, perfluoroalkoxy, polyvinylidene, polytetrafluoroethylene, and copolymers, blends and mixtures thereof.

An outer layer of a polar polymer is extruded around and bonded to the inner layer of the modified fluoropolymer. Examples of such polar polymers include but are not limited to polyamides, modified polyamides, polyamide alloys and polyamide blends.

One difficulty associated with bonding fluoropolymer with a polar polymer is that fluoropolymer is not polar. To improve adhesion or miscibility of two dissimilar polymers, the present invention modifies one or both of the polymers to provide favorable specific interactions between two polymers leading to a negative contribution to the Gibbs free energy of mixing. These interactions include hydrogen bonding, donor-acceptor interactions, dipole-dipole interactions, anion-cation interactions, ion-dipole interactions, and intrachain repulsion.

The fluoropolymer of the present invention is modified by attaching a different function group which increases the polarity of the fluoropolymer. More specifically the fluoropolymer is modified to contain a reactive group which is more polar than the functional group the reactive group replaces. Examples of such reactive groups include but are not limited to acrylate, maleic anhydride, isocyanurate and mixtures thereof.

A twelfth embodiment of the present invention is a three-layer tubing assembly for use in fuel-line applications or a three-layer container assembly for use in fuel containment applications. It includes an extruded inner semi-conductive and permeation-resistant fluoropolymer layer. The fluoropolymer is made semi-conductive by mixing it with 0.1% to 10% by weight of conductive carbon black. It has a surface resistivity in the range of about $10^3$ to $10^8$ ohm/sq. Suitable fluoropolymers are the same as those fluoropolymers identified as suitable in the first embodiment.

A layer of modified fluoropolymer containing a reactive group is extruded around the inner layer of conductive fluoropolymer. Suitable modified fluoropolymers are the same those modified fluoropolymers identified in the eleventh embodiment. A layer of polar polymer is extruded around and bonded to the modified fluoropolymer. Suitable polar polymers are the same as those polar polymers identified as suitable in the eleventh embodiment.

A thirteenth embodiment of the present invention is a two-layer tubing assembly for use in fuel-line applications or a two-layer container assembly for use in fuel containment applications. It includes an inner layer of a conductive polymer comprising a polymer and a conductive filler. Suitable polymer for mixing with the conductive filler include but are not limited to fluoropolymers, polyamides, polyimides, polyesters, epoxies, polyurethanes, polyphenylene sulfides, polyacetals, phenolic resins, polyketones, polyvinyl chloride, polyolefins and their copolymers, blends, and mixtures thereof. Suitable fluoropolymers include but are not limited to ethylene tetrafluoroethylene, fluorinate ethylene propylene, hexafluoropropylene, perfluoromethyvinylether, chlorotrifluoroethylene, ethylene chlorotrifluoroethylene, tetrafluoroethylene hexafluoropropylene vinylidene, perfluoromethyvinylether, chlorotrifluoroethylene, ethylene chlorothrifluoroethylene, tetrafluoroethylene hexafluoropropylene vinylidene, perfluoroalkoxy, polyvinylidene, polytetrafluoroethylene, and copolymers, blends and mixtures thereof. A layer of a polar polymer is extruded around and bonded to the layer of conductive polymer. Suitable polar polymers are the same as those polar polymers identified to be suitable in the eleventh embodiment.

According to the present invention, another method to improve conductivity of a fluoropolymer is to add conductive filler to the fluoropolymer. Examples of such conductive fillers include but are not limited to mesophase pitch-based graphitic foam in particle form with extremely high electric and thermal conductivity for dissipating static electrically energy and thermal energy. For the purpose of this application, particle form is defined as having a size from 0.1 micron to 500 micron in particle length. To obtain the desirable conductivity characteristic, the conductive fluoropolymer should comprise 0.1% to 15% by weight conductive filler.

A fourteenth embodiment of the present invention is a three-layer tubing assembly for use in fuel-line applications or a three-layer container for use in fuel containment applications. It includes an extruded inner conductive and permeation-resistant floropolymer layer. The fluoropolymer is made conductive by mixing it with 0.1% to 15% by weight conductive filler. Examples of such conductive fillers include but are not limited to mesophase pitch-based graphitic foam in particle form with extremely high electric and thermal conductivity for dissipating static electrically energy and thermal energy. The conductive polymer has a surface resistivity in the range of about $10^3$ to $10^8$ ohm/sq. A layer of a modified fluoropolymer is extruded around the inner layer of conductive fluoropolymer. Suitable modified fluoropolymers are the same those modified fluoropolymers identified in the eleventh embodiment. A layer of polar polymer is extruded around and bonded to the layer of modified fluoropolymer. Suitable polar polymers are the same as those polar polymers identified to be suitable in the eleventh embodiment.

A fifteenth embodiment of the present invention is a three-layer tubing assembly for use in fuel-line applications or a three-layer container for use in fuel containment applications. It includes an inner layer of polymer having good permeation or chemical resistance. A middle-layer of damping polymeric material extruded around or applied on the inner polymeric layer and an outer polymer extruded around the damping layer.

The inner polymer layer and the outer polymer layer may be the same polymer or they may be different polymers. Examples of such polymers for forming the inner polymer layer and/or the outer polymer layer include but are not limited to fluoropolymers, polyamides, polyimides, polyesters, epoxies, polyurethanes, polyphenylene sulfides, polyacetals, phenolic resins, polyketones, polyvinyl chloride, polyolefins and their copolymers, blends and mixtures thereof.

The polymer for forming the inner polymeric layer and/or the outer polymeric layer may also be conductive for dissipating static electric energy and thermal energy. The conductive polymer comprises a polymer resin and a conductive filler. Examples of such polymer resins include but are not limited to elastomers, thermoplastic elastomers, block copolymers, fluoropolymers, polyamides, polyimides, polyesters, epoxies, polyurethanes, polyphenylene sulfides, polyacetals, phenolic resins, polyketones, polyvinyl chloride, polyolefins, and copolymers, blends and mixtures thereof. The conductive filler is made from mesophase pitch-based graphitic foam in particle form with extremely high electric and thermal conductivity.

The middle layer of polymeric material has a high damping factor (the ratio of the loss modulus over the storage modulus) but with a modulus lower than the modulus of the material forming the inner-layer and the material forming the outer-layer. The multi-layer assembly with a constrained damping layer structure has a much higher damping efficiency than that of free damping layer structure which is without an outer layer of high modulus material covering the damping material layer. The damping material layer exhibits both the capacity to store energy (elastic) and the capacity to dissipate energy (viscous). The damping material may be extruded around the inner layer or the damping material can be applied on the inner layer with a brush or spray. Examples of such damping polymers which can be extruded include but are not limited to fluoropolymers, polyamides, polyimides, polyesters, epoxies, polyurethanes, polyphenylene sulfides, polyketones, polyvinyl chloride, polyolefins, and copolymers, blends and mixtures thereof. Examples of such damping polymers which can applied on the inner layer with a brush or spray include but are not limited to elastomers, thermoplastic elastomers, and block copolymers comprising a rigid block polymer and a flexible block polymer.

The extrudable damping polymer for forming the middle layer may have a non-foamed structure or a foamed structure. A foamed structure increases the damping characteristic of the middle layer. The foaming of the extrudable damping polymer is caused by the addition of a blowing agent into the damping polymer. Examples of such blowing agents include but are not limited to azodicarbonamides, hydrazine derivatives, semicarbazides, tetrazoles, benzoxazines and mixtures thereof. The blowing agent is mixed with the damping polymer just prior to the extrusion process. Following the extrusion of the damping polymer, the blowing agent will cause the damping polymer to expand or foam, thus creating void spaces within the outer layer.

The damping polymeric material can also be a multiphase polymer. The multiphase polymer has at least two glass transition temperatures in which their morphology and property can be manipulated by a thermodynamic process to create the desired damping characteristic. Suitable multiphase polymers are the same as those identified in the first embodiment.

A sixteenth embodiment of the present invention is a three-layer tubing assembly for use in fuel-line applications or a three-layer container for use in fuel containment applications. It is essentially the same as the multi-layer assembly identified in the fifteenth embodiment but includes an inner layer of metal rather than an inner layer of polymer. The sixteenth embodiment includes an inner layer of metal. A middle-layer of damping polymeric material is extruded around or applied on the inner polymeric layer and an outer polymer is extruded around the damping layer.

The metal for forming the inner layer is selected from the group consisting of steel, aluminum, copper and their alloys. The inner layer of metal may be treated to provide corrosion protection. Suitable material for treating the inner layer include but are not limited to terne (an alloy of normally 85% lead and 15% tin), zinc-rich paint, aluminum-rich paint, electroplated zinc or zinc-nickel, zinc-aluminum alloy (or also known under the trademark GALFAN), hot dip aluminum, epoxy coating, polyvinyl fluoride or polyvinyl di-fluoride coating, nylon coating and combination thereof.

Suitable damping polymers for forming the middle layer are the same as those damping polymers identified as suitable in the fifteenth embodiment. Suitable polymer for forming the outer layer the same as those polymers identified as suitable in the fifteenth embodiment. As in the fifteenth embodiment, the damping polymer in the sixteenth embodiment has a high damping factor but with a modulus lower than the modulus of the material forming the inner-layer and the material forming the outer-layer material.

A seventeenth embodiment of the present invention is a three-layer tubing assembly for use in fuel-line applications or a three-layer container for use in fuel containment applications. The seventeenth embodiment includes an inner permeation resistance layer of polymeric material. A middle-layer of metallic material surrounds the inner permeation resistance layer of polymeric material and an outer damping layer of polymeric material is extruded around the middle layer of metallic material. The metallic material can be extruded, blow molded or wrapped around the inner permeation resistance layer.

The polymeric material for forming the permeation resistance layer is selected from the group consisting of fluoropolymers, polyamides, polyimides, polyesters, epoxies, polyurethanes, polyphenylene sulfides, polyacetals, phenolic resins, polyketones, polyvinyl alcohols, polyolefins, and mixtures thereof.

The metallic material for forming the middle layer is selected from the group consisting of steel, aluminum, copper and their alloys. Suitable polymeric material for forming the outer damping layer may be from the same group of the polymeric material suitable for forming the inner permeation resistance layer. Alternatively, the polymeric material for forming the outer damping layer may be formed of a multiphase polymer. Suitable multiphase polymers are the same as those identified as suitable for the first embodiment.

The eighteenth embodiment of the present invention is a four-layer tubing assembly for use in fuel-line applications or a four-layer container for use in fuel containment applications. It is essentially the same as the multi-layer assembly identified in the seventeenth embodiment but includes a layer of adhesive between the layer of metallic material and the damping layer of polymeric material. The eighteenth embodiment includes an inner permeation resistance layer of polymeric material. A layer of metallic material surrounds the inner permeation resistance layer of polymeric material. The metallic material can be extruded, blow molded or wrapped around the inner permeation resistance layer. A layer of adhesive is extruded around the layer of metallic material and an outer damping layer of polymeric material is extruded around the layer of adhesive. Suitable polymeric materials for forming the inner permeation resistance layer are the same as those identified as suitable for the seventeenth embodiment. Suitable metallic materials are the same as those identified as suitable for the seventeenth embodiment. Suitable polymeric materials for forming the damping layer are the same as those identified as suitable for the seventeenth embodiment.

The adhesive can be a single-phase polymer or a multiphase polymer. The multiphase polymer is a polymer blend or alloy that has a multiphase morphology wherein one phase is adherable to the metallic material for forming the metallic layer and another phase is compatible or miscible with the polymeric material for forming the damping layer. Suitable multiphase polymers for forming the adhesive layer are the same as those identified as suitable for the first embodiment.

The nineteenth embodiment of the present invention is a two-layer tubing assembly for use in fuel-line applications or a two-layer container for use in fuel containment applications. It includes an extrudable inner permeation-resistance layer of polymeric material. Suitable polymeric material for forming the inner permeation-resistance layer include but are not limited to fluoropolymers, polyamides, polyimides, polyesters, epoxies, polyurethanes, polyphenylene sulfides, polyacetals, phenolic resins, polyketones, polyvinyl alcohols, polyolefins, and mixtures thereof.

A multiphase polymer cover layer, capable of bonding to the thermoplastic inner layer, is coextruded around the thermoplastic layer. Suit multiphase polymers for forming the cover layer are the same as those identified for forming the cover layer in the first embodiment.

The twentieth embodiment of the present invention is a three-layer tubing assembly for use in fuel-line applications or a three-layer container for use in fuel containment applications. It is essentially the same as the multi-layer assembly identified in the nineteenth embodiment but includes a conductive layer of conductive polymeric material radially inwardly of the permeation resistance layer. The twentieth embodiment includes a conductive layer of conductive polymeric material. A permeation resistance layer of polymeric material is extruded around the conductive layer. A layer of multiphase polymer is coextruded around the inner permeation resistance layer of polymeric material. Suitable polymeric materials for forming the permeation resistance layer are the same as those identified as suitable for the nineteenth embodiment. Suitable multiphase polymers are the same as those identified as suitable for the nineteenth embodiment.

The conductive polymeric material is made conductive by mixing polymeric material with 1% to 10% by weight of conductive carbon black or by mixing polymeric material with 1% to 10% by weight of metallic conductive filler selected from the group consisting of silver, copper and steel. Suitable polymeric materials include but are not limited to fluoropolymers, polyamides, polyimides, polyesters, epoxies, polyurethanes, polyphenylene sulfides, polyacetals, phenolic resins, polyketones, polyvinyl alcohols, polyolefins, and mixtures thereof. The resultant conductive polymeric material has a surface resistivity in the range of about $10^3$ to $10^8$ ohm/sq.

The twenty-first embodiment of the present invention is a four-layer tubing assembly for use in fuel-line applications or a four-layer container for use in fuel containment applications. The twenty-first embodiment includes an inner layer of polymeric material. A permeation resistance layer of polymeric material is extruded around the inner layer. A layer of multiphase polymer is coextruded around the permeation resistance layer of polymeric material. A cover layer polymeric material is extruded around the layer of multiphase polymer. The polymeric material for forming the cover layer can be a single phase polymer or a multiphase polymer. Suitable polymeric materials for forming the inner layer include but are not limited to fluoropolymers, polyamides, polyimides, polyesters, epoxies, polyurethanes, polyphenylene sulfides, polyacetals, phenolic resins, polyketones, polyvinyl alcohols, polyolefins, and mixtures thereof. The polymeric material for forming the inner layer can be nonconductive or conductive. The conductive polymeric material is made conductive in the same manner as disclosed in the twentieth embodiment.

Suitable polymeric materials for forming the permeation resistance layer are the same as those identified as suitable for the twentieth embodiment. Suitable multiphase polymers are the same as those identified as suitable for the twentieth embodiment. Suitable single phase polymer for forming the cover layer include but are not limited to fluoropolymers, polyamides, polyimides, polyesters, epoxies, polyurethanes, polyphenylene sulfides, polyacetals, phenolic resins, polyketones, polyvinyl alcohols, polyolefins, and mixtures thereof. The preferred polymeric material for forming the cover layer is polyamide 12.

The twenty-second embodiment of the present invention is a five-layer tubing assembly for use in fuel-line applications or a five-layer container for use in fuel containment applications. The twenty-second embodiment includes an innermost layer of conductive polymeric material. An inner layer of polymeric material is extruded around the innermost layer of conductive polymeric material. A permeation resistance layer of polymeric material is extruded around the inner layer. A layer of multiphase polymer is coextruded around the permeation resistance layer of polymeric material. A cover layer polymeric material is extruded around the layer of multiphase polymer. The polymeric material for forming the cover layer can be a single phase polymer or a multiphase polymer. Suitable polymeric materials for forming the inner layer include but are not limited to fluoropolymers, polyamides, polyimides, polyesters, epoxies, polyurethanes, polyphenylene sulfides, polyacetals, phenolic resins, polyketones, polyvinyl alcohols, polyolefins, and mixtures thereof. The polymeric material for forming the inner layer can be nonconductive or conductive. The conductive polymeric material is made conductive in the same manner as disclosed in the twentieth embodiment.

Suitable polymeric materials for forming the permeation resistance layer are the same as those identified as suitable for the twentieth embodiment. Suitable multiphase polymers are the same as those identified as suitable for the twentieth embodiment. Suitable single phase polymer for forming the cover layer include but are not limited to fluoropolymers, polyamides, polyimides, polyesters, epoxies, polyurethanes, polyphenylene sulfides, polyacetals, phenolic resins, polyketones, polyvinyl alcohols, polyolefins, and mixtures thereof. The preferred polymeric material for forming the cover layer is polyamide 12.

Various features of the present invention have been described with reference to the above embodiments. It should be understood that modification may be made without departing from the spirit and scope of the invention as represented by the following claims.

What is claimed is:

1. A multi-layer assembly for fluid and vapor handling and containment systems comprising:
   an inner layer of polymeric material; and
   a layer of multiphase polymer surrounding said inner layer, said multiphase polymer is miscible with said polymeric material for forming said inner layer.

2. The multi-layer assembly as claimed in claim 1 wherein multiphase polymer is selected from a group consisting of polyamides, polyesters, polyurethanes, polyvinyl chlorides, polyalkylene naphthalate, polybutylene terephthalate, polyolefins, their copolymers, terpolymers, polymer blends, and polymer alloys.

3. The multi-layer assembly as claimed in claim 2 wherein polyamide is selected from a group consisting of polyamide 12, polyamide 6, their copolymers and terpolymers.

4. The multi-layer assembly as claimed in claim 1 wherein polymeric material for forming said inner layer is selected from the group consisting of fluoropolymers, polyamides, polyimides, polyesters, epoxies, polyurethanes, polyphenylene, sulfides, polyacetals, phenolic resins, polyketones, polyvinyl alcohols, polyolefins, and mixtures thereof.

5. The multi-layer assembly as claimed in claim 1 further comprising a conductive layer of conductive polymeric material radially inwardly of said, inner layer.

6. The multi-layer assembly as claimed in claim 5 wherein said conductive polymeric material comprises 1% to 10% by weight of conductive carbon black.

7. The multi-layer assembly as claimed in claim 5 wherein said conductive polymeric material comprises 1% to 10% by weight of metallic conductive filler selected from the group consisting of silver, copper and steel.

8. The multi-layer assembly as claimed in claim 5 wherein polymeric material for forming said conductive layer is selected from the group consisting of fluoropolymers, polyamides, polyimides, polyesters, epoxies, polyurethanes, polyphenylene sulfides, polyacetals, phenolic resins, polyketones, polyvinyl alcohols, polyolefins, and mixtures thereof.

9. The multi-layer assembly as claimed in claim 5 wherein said conductive layer has a surface resistivity of approximately $10^3$ to $10^8$ ohm/sq.

10. A multi-layer assembly for fluid and vapor handling and containment systems comprising:
    an inner layer of polymeric material;
    a permeation resistance layer of polymeric material surrounding said inner layer;
    a layer of multiphase polymer surrounding said permeation layer; and
    a cover layer of polymeric material surround said layer of multiphase polymer.

11. The multi-layer assembly as claimed in claim 10 wherein said multiphase polymer is selected from a group consisting of polyamides, polyesters, polyurethanes, polyvinyl chloride, polyalkylene naphthalate, polybutylene terephthalate, polyolefins, their copolymers, terpolymers, polymer blends and polymer alloys.

12. The multi-layer assembly as claimed in claim 11 wherein said polyamides are selected from a group consisting of polyamide 12, polyamide 6, their copolymers and terpolymers.

13. The multi-layer assembly as claimed in claim 10 wherein said polymeric material for forming said cover layer is polyamide 12.

14. The multi-layer assembly as claimed in claim 10 wherein said polymeric material for forming said cover layer is a multiphase polymer.

15. The multi-layer assembly as claimed in claim 14 wherein said multiphase polymer for forming said cover layer is selected from a group consisting of polyamides, polyesters, polyurethanes, polyvinyl chloride, polyalkylene naphthalate, polybutylene terephthalate, polyolefins, their copolymers, terpolymers, polymer blends and polymer alloys.

16. The multi-layer assembly as claimed in claim 10 wherein said inner layer of polymeric material is a conductive polymer.

17. The multi-layer assembly as claimed in claim 16 wherein said conductive layer has a surface resistivity of approximately $10^3$ to $10^8$ ohm/sq.

18. The multi-layer assembly as claimed in claim 10 further comprising a conductive layer of conductive polymeric material radially inwardly of said inner layer of polymeric material.

19. The multi-layer assembly as claimed in claim 10 wherein said polymeric material for forming said inner layer is selected from the group consisting of fluoropolymers, polyamides, polyimides, polyesters, epoxies, polyurethanes, polyphenylene sulfides, polyacetals, phenolic resins, polyketones, polyvinyl alcohols, polyolefins and mixtures thereof.

20. The multi-layer assembly as claimed in claim 10 wherein said polymeric material for forming said permeation layer is selected from the group consisting of fluoropolymers, polyamides, polyimides, polyesters, epoxies, polyurethanes, polyphenylene sulfides, polyacetals, phenolic resins, polyketones, polyvinyl alcohols, polyolefins and mixtures thereof.

21. A multi-layer assembly for fluid and vapor handling and containment systems comprising:
   an inner layer of polymeric material;
   a layer of metallic material surrounding said inner layer of polymeric material; and
   an outer layer of multiphase polymer surrounding said layer of metallic material.

22. The multi-layer assembly as claimed in claim 21 wherein said multiphase polymer for forming said outer layer is selected from the group consisting of polyamides, polyolefins, polyesters, polyketones, vinyl alcohols, fluoropolymers, polyurethanes, their copolymers, terpolymers, polymer blends, and polymer alloys.

23. A multi-layer assembly for fluid and vapor handling and containment systems comprising:
   an inner layer of polymeric material;
   a layer of metallic material surrounding said inner layer of polymeric material;
   an outer layer of polymeric material surrounding said layer of metallic material; and
   an adhesive layer of multiphase polymer located between said layer of metallic material and said outer layer of polymeric material.

24. The multi-layer assembly as claimed in claim 23 wherein said multiphase polymer for forming said adhesive layer is selected from the group consisting of homopolymers, copolymers, terpolymers, polymer blends and polymer alloys of polyamides, polyesters, polyurethanes, polyvinyl chlorides, polyalklene napthalate, polyutylene terephthalate, polyolefins, matallocene polyolefins, polyarylic, maleic anhyride modified polyolefins and ionomer resins.

25. A multi-layer assembly for fluid and vapor handling and containment systems comprising:
   an inner layer of polymeric material;
   a layer of metallic material extruded around said inner layer of polymeric material; and
   an outer layer of polymeric material surrounding said layer of metallic material.

26. A multi-layer assembly for fluid and vapor handling and containment systems comprising:
   a layer of blow molded metallic material;
   an inner layer of polymeric material radially inwardly of said layer of metallic material; and
   an outer layer of polymeric material surrounding said layer of metallic material.

* * * * *